US010968689B2

(12) United States Patent
Brigham

(10) Patent No.: US 10,968,689 B2
(45) Date of Patent: Apr. 6, 2021

(54) ACCESS PORT SEAL

(71) Applicant: Integrity Products & Supplies Inc., Sherwood Park (CA)

(72) Inventor: Graham Brigham, Sherwood Park (CA)

(73) Assignee: INTEGRITY PRODUCTS & SUPPLIES INC., Sherwood Park (CA)

( * ) Notice: Subject to any disclaimer, the term of this patent is extended or adjusted under 35 U.S.C. 154(b) by 0 days.

(21) Appl. No.: 15/117,198

(22) PCT Filed: Feb. 19, 2016

(86) PCT No.: PCT/CA2016/050167
§ 371 (c)(1),
(2) Date: Oct. 7, 2016

(87) PCT Pub. No.: WO2017/066866
PCT Pub. Date: Apr. 27, 2017

(65) Prior Publication Data
US 2017/0260801 A1    Sep. 14, 2017

Related U.S. Application Data

(63) Continuation-in-part of application No. 14/887,776, filed on Oct. 20, 2015, now abandoned, which is a
(Continued)

(51) Int. Cl.
*E06B 7/232*    (2006.01)
*E06B 7/23*    (2006.01)
(Continued)

(52) U.S. Cl.
CPC ............ *E06B 7/232* (2013.01); *E06B 7/2305* (2013.01); *E06B 7/2314* (2013.01); *F16J 13/14* (2013.01);
(Continued)

(58) Field of Classification Search
CPC .......... F16L 45/00; F16L 59/22; E06B 7/232; E06B 7/2305; E06B 7/2314
(Continued)

(56) References Cited

U.S. PATENT DOCUMENTS 1,884,879 A * 10/1932 Sanders ................ F25D 23/087
277/637
2,004,122 A *  6/1935 Loibl, Jr. ............ A01M 1/2044
116/1
(Continued)

FOREIGN PATENT DOCUMENTS

| CA | 2782882 | 2/2013 |
| WO | 97/44610 | 11/1997 |

OTHER PUBLICATIONS

International Searching Authority, International Search Report, dated Mar. 23, 2016.
(Continued)

*Primary Examiner* — Eugene G Byrd
(74) *Attorney, Agent, or Firm* — Davis & Bujold PLLC; Michael J. Bujold

(57) ABSTRACT

An apparatus for sealing an opening in a metal sheath surrounding an insulated pipe is provided, the apparatus including a base comprising an outer flange securable within the opening, and defining an inner passage therethrough, the base having an annular ridge extending into the inner passage; a flexible waterproof body positionable within the inner passage, the body having a periphery therearound and a groove located within the periphery adapted to engage around the annular ridge; and a flexible metal element within the base.

30 Claims, 7 Drawing Sheets

Related U.S. Application Data continuation-in-part of application No. 14/255,817, filed on Apr. 17, 2014, now abandoned, which is a continuation-in-part of application No. 13/137,568, filed on Aug. 26, 2011, now abandoned.

(51) Int. Cl.

| | |
|---|---|
| *F16L 45/00* | (2006.01) |
| *F16L 59/22* | (2006.01) |
| *F16J 13/14* | (2006.01) |
| *F16L 59/16* | (2006.01) |
| *F16L 59/14* | (2006.01) |
| *F16J 15/06* | (2006.01) |

(52) U.S. Cl.
CPC ............ *F16J 15/062* (2013.01); *F16L 45/00* (2013.01); *F16L 59/14* (2013.01); *F16L 59/16* (2013.01); *F16L 59/22* (2013.01); *Y10T 137/8158* (2015.04)

(58) Field of Classification Search
USPC .................. 277/641, 642, 637, 375; 220/375
See application file for complete search history.

(56) References Cited

U.S. PATENT DOCUMENTS

| | | | | |
|---|---|---|---|---|
| 2,072,426 A * | 3/1937 | Kraft | ...................... | B65D 85/84 206/521 |
| 3,018,024 A * | 1/1962 | Foord | .................... | B65D 5/727 222/498 |
| 3,021,976 A * | 2/1962 | Tracy | ................... | B65D 17/506 220/254.7 |
| 3,031,111 A * | 4/1962 | Stull | ...................... | B65D 47/10 220/375 |
| 3,213,584 A * | 10/1965 | Bush | ........................ | E04B 1/68 277/641 |
| 3,682,349 A * | 8/1972 | Cospen | ................ | B65D 17/506 220/200 |
| 3,744,662 A * | 7/1973 | Zundel | ................. | B65D 17/506 220/269 |
| 3,862,748 A * | 1/1975 | Grise | ..................... | B01F 7/0005 366/248 |
| 3,945,529 A * | 3/1976 | Haag | ...................... | B65D 51/20 220/254.1 |
| 4,082,301 A * | 4/1978 | Salinger | .............. | A47L 15/4285 16/2.2 |
| 4,369,888 A * | 1/1983 | Walter | ................. | B65D 47/141 215/237 |
| 4,391,385 A * | 7/1983 | Rausing | ................ | B65D 39/02 220/269 |
| 4,415,005 A | 11/1983 | Janzen | | |
| 4,422,788 A * | 12/1983 | Braithwaite | ........ | B05C 17/0316 222/1 |
| 4,738,376 A * | 4/1988 | Markus | .............. | B60K 15/0406 220/254.3 |
| 4,764,162 A * | 8/1988 | Romanauskas | ........... | B04B 7/02 277/641 |
| 4,938,378 A * | 7/1990 | Kraus | ..................... | B62D 25/24 220/789 |
| 5,010,926 A | 4/1991 | Kurth | | |
| 5,287,983 A * | 2/1994 | Reil | ....................... | B65D 5/746 215/232 |
| 5,348,182 A * | 9/1994 | Luch | ....................... | B29C 57/12 215/253 |
| 5,351,718 A | 10/1994 | Barton | | |
| 5,443,175 A * | 8/1995 | Kelly | .................... | B65D 17/506 220/212.5 |
| 5,518,033 A | 5/1996 | Webster | | |
| 5,901,502 A | 5/1999 | Rafalski et al. | | |
| 6,082,576 A | 7/2000 | Counts-Bradley | | |
| 6,220,635 B1 | 4/2001 | April | | |
| 6,360,909 B1 * | 3/2002 | Bridge | ................ | B65D 43/022 220/258.2 |
| 6,505,839 B1 * | 1/2003 | Nishimura | .............. | F16F 9/526 220/241 |
| 6,776,422 B1 * | 8/2004 | Toy | ........................ | F16J 15/025 277/628 |
| 6,942,452 B2 * | 9/2005 | Bruno | ..................... | F01D 9/065 16/2.2 |
| 6,945,539 B2 * | 9/2005 | Whitlow | ............. | F16J 15/0887 277/609 |
| 7,946,444 B2 | 5/2011 | Counts-Bradley | | |
| 8,336,728 B2 * | 12/2012 | Forrest | ................ | B65D 17/506 220/254.8 |
| 2005/0184026 A1 * | 8/2005 | Haley | ................... | B65D 47/06 215/306 |
| 2005/0247714 A1 * | 11/2005 | Backes | ................. | B65D 51/24 220/375 |
| 2007/0245479 A1 * | 10/2007 | Schroeder | ................ | E04H 4/08 4/498 |
| 2008/0308567 A1 * | 12/2008 | Counts-Bradley | .... | F16L 55/115 220/789 |
| 2014/0224358 A1 * | 8/2014 | Brigham | ................ | F16L 59/16 137/551 |

OTHER PUBLICATIONS ntemational Preliminary Examining Authority, International Preliminary Report on Patentability, dated Sep. 12, 2017, 13 pages, Gatineau, Quebec.

* cited by examiner

ACCESS PORT SEAL

RELATED APPLICATIONS

This application is a national entry (371) of international Application No. PCT/CA2016/050167, filed Feb. 19, 2016. This application is also a continuation-in-part of U.S. patent application Ser. No. 14/887,776 entitled "Access Port Seal" and filed on Oct. 20, 2015, in the name of Graham Brigham; which is a continuation-in-part of U.S. patent application Ser. No. 14/255,817 entitled "Access Port Seal" and filed on Apr. 17, 2014, in the name of Graham Brigham; which is a continuation-in-part of U.S. patent application Ser. No. 13/137,568 entitled "Access Port Seal" and filed on Aug. 26, 2011, in the name of Graham Brigham; all of which are hereby incorporated by reference in their entirety.

BACKGROUND OF THE INVENTION

Field of Invention

The present invention relates to plugs in general and in particular to plugs for insulated coverings to allow access through the insulated covering.

Description of Related Art

In many industries, it is frequently necessary to access pipes or other conduits to conduct inspection, maintenance and the like. Such pipes and conduits are often insulated to protect the contents from adverse weather, temperatures, and the like. In particular, in the oil and gas industry, it is common to position insulation around pipes within a sheath of protective sheet metal.

Conventionally, when it has been necessary to provide access to a pipe or its contents which have an insulating layer, a hole is cut in the sheet metal and the insulation removed from that region to form an opening for access to the pipe. After the maintenance, inspection or the like has been performed on the pipe, insulation is reinserted into the cavity and a new layer of sheet metal secured over the cut in the sheet metal to provide a patch in the original sheet metal. Problematically, such patches have been unsatisfactory at providing the original level of insulation and protection of the pipe from adverse weather. In particular, such sheet metal patches have been known to leak when subjected to rain or melting snow.

The compromised insulation and protective sheath poses a problem for the insulation under the metal patch as well as the surrounding region as the insulation typically used for such applications is fiberglass batting or other fibrous material. Such materials are known to be intolerant of water, and are prone to compacting when damp. Such compacting of the insulation impairs the ability of the insulation to adequately insulate the pipe in that location as well as any surrounding regions which may also become wet.

An additional difficulty of such patches are that once they are installed, subsequent removal of the patch for future maintenance or inspection may increase the size of the screw holes used to keep the patch in position, thereby further increasing the ability of water to enter the insulation.

SUMMARY OF THE INVENTION

An apparatus for sealing an opening in a metal sheath surrounding an insulated pipe is provided, the apparatus including a base having an outer flange securable within the opening, and defining an inner passage therethrough, the base further having an annular ridge extending into the inner passage; a flexible waterproof body positionable within the inner passage, the body having a periphery therearound and a groove located within the periphery adapted to engage around the annular ridge; and a flexible metal element within the base.

The flexible metal element may circumferentially surround the inner passage and may be made of steel. The body may be formed of neoprene, rubber, silicone or closed cell foam. The body may be elongate with substantially parallel sides or may be circular.

The groove may have a constant radius and the radius may be less than ½ inch. The groove may be located in the middle of the peripheral edge. A leading surface of the periphery may extend from the groove by a distance greater than a trailing surface of the periphery. At least one of the leading and trailing surface peripheral edges is rounded.

The apparatus may include a securing means securing the base to the body, which may be a strap integrally formed with the body. The base may be integrally formed with the strap and the body. The body may be at least partially coated with a polyurea elastomer.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
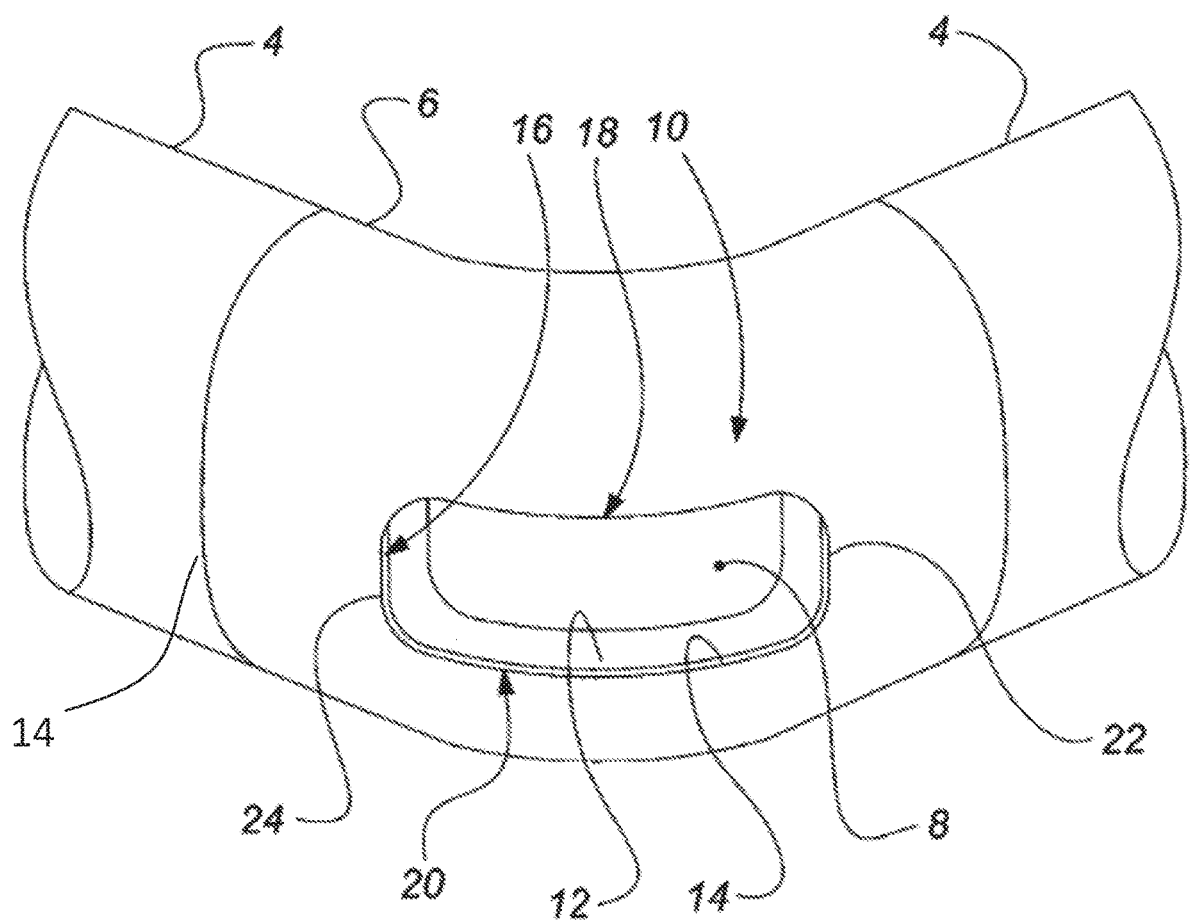
FIG. 1 is a perspective view of an insulated pipe having a hole cut in the insulation for access to the pipe.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The term "invention" and the like mean "the one or more inventions disclosed in this application", unless expressly specified otherwise.

The terms "an aspect", "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise. The term "plurality" means "two or more", unless expressly specified otherwise. The term "herein" means "in the present application, including anything which may be incorporated by reference", unless expressly specified otherwise.

The term "e.g." and like terms mean "for example", and thus does not limit the term or phrase it explains.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. Section 1.72(b) or similar law in other jurisdictions. The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

Referring to FIG. 1, an opening through pipe insulation is shown generally at 10. The pipe 8 is surrounded by an insulating layer 12 and a sheath layer 14. The opening is defined by an opening edge 16 having top and bottom straight edges, 18 and 20, respectively, and first and second arcuate portions 22 and 24 therebetween. As illustrated, the opening 10 may be located within an elbow portion 6 of the pipe 8 and pipe insulation 12; however it will be appreciated that the opening may also be located within a straight portion 4 of pipe 8 or at any other location desired by a user.

Figure 2:
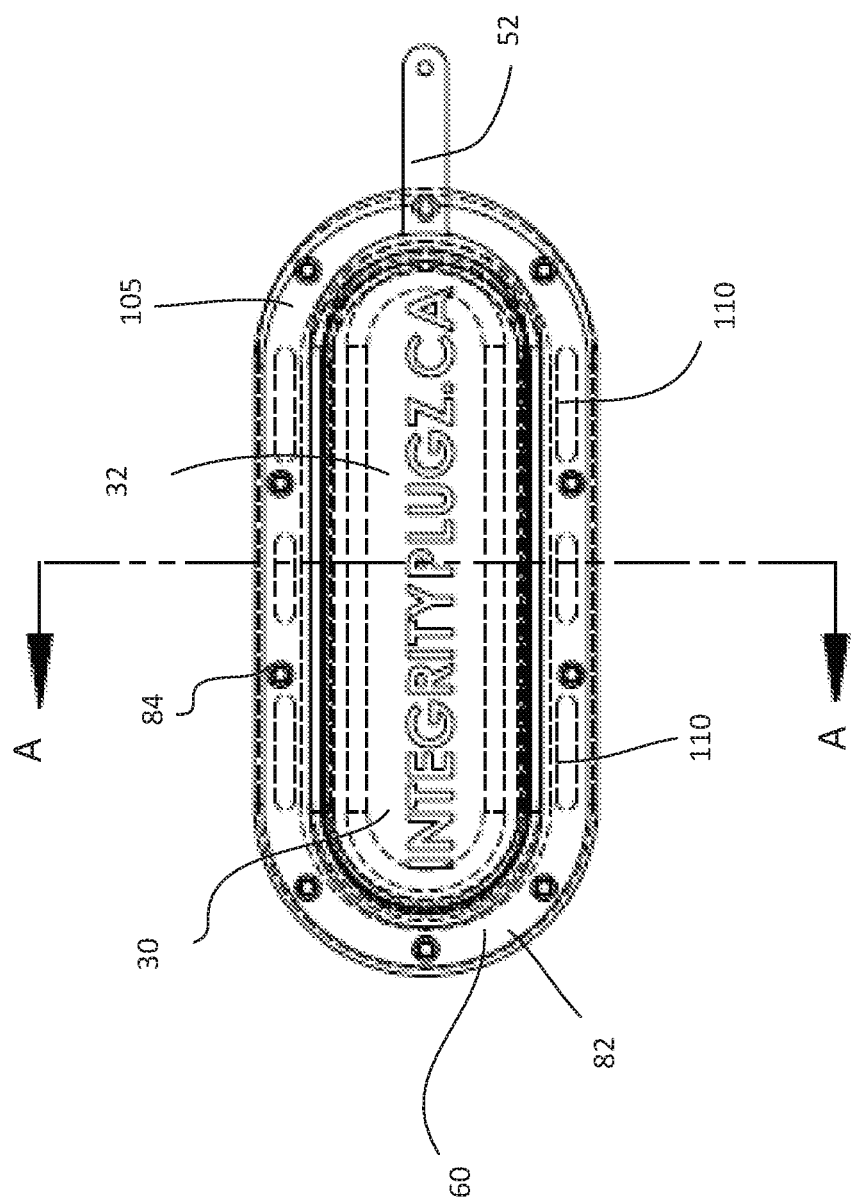
FIG. 2 is a top view of an apparatus according to the invention showing hidden elements therein.
Figure 3:
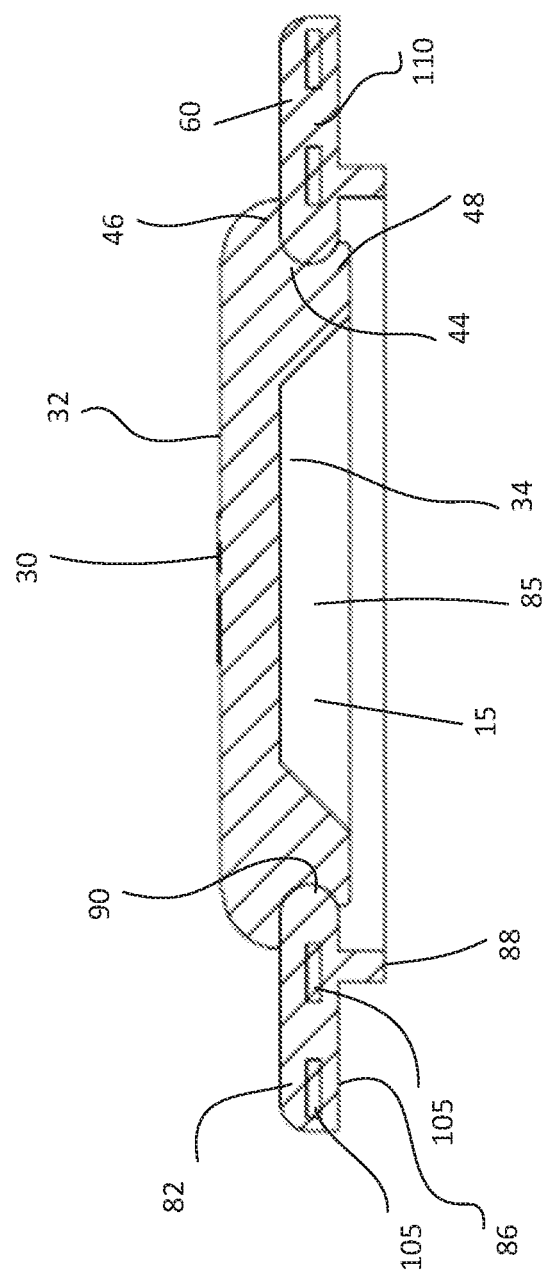
FIG. 3 is a cross sectional view thereof as taken along line A-A in FIG. 2.
Figure 6:
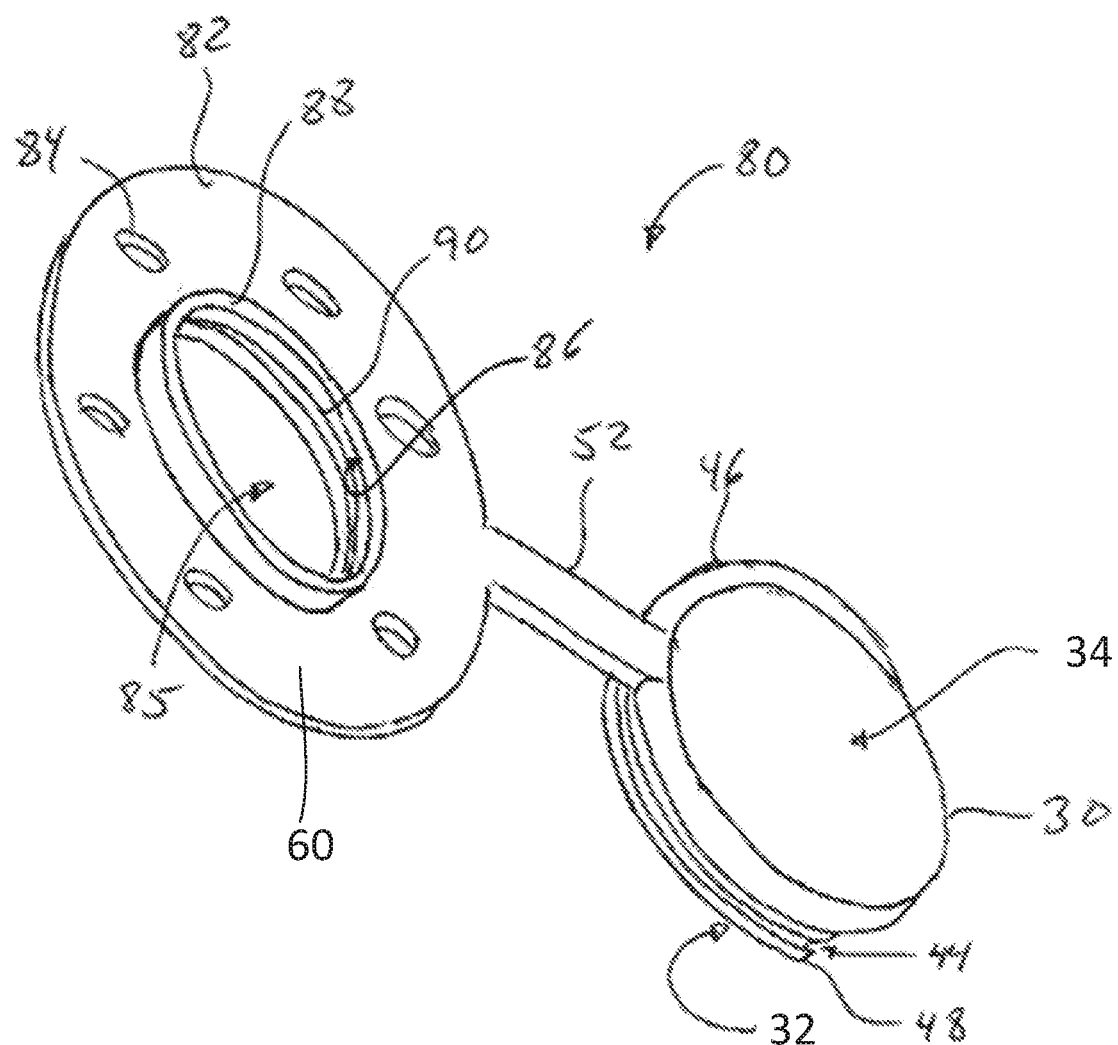
FIG. 6 is a perspective view of an apparatus according to a further embodiment of the present invention.

With reference to FIG. 2 and FIG. 3, the apparatus comprises a plug body 30 sized and shaped to be sealably received within the opening 15 of base 60. The body 30 comprises a member having front and rear surfaces, 32 and 34, respectively. Although the body 30 is illustrated and described as having an elongate shape, it will be appreciated that other shapes may be utilized as well, such as, by way of non-limiting example, circular as illustrated in FIG. 6, oval, rectangular, square, triangular, octagonal or irregular. Additionally, although the body 30 is illustrated as being adapted for insertion into an elbow portion 6, it will be appreciated that the body may be adapted for fitting into a straight portion 4 or other section of the sheath layer 14. For use in the straight portion 4, the body 30 and base 60 may be shaped to have a straight profile whereas for an elbow portion 6, the body 30 and base 60 may be shaped to a curved profile or otherwise corresponding to the curvature of the intended section of the sheath layer 14. Base 60 is securable to opening edge 16 of the opening as will be further described below.

Base 60 includes a flexible metal element 105 may be circumferentially placed within base 60 allowing base 60 to be bent into a shape to fit a curve or irregularity in pipe 8. Flexible element 105 may be made of black mild steel, or tin, aluminum, a zinc alloy, galvanized steel, copper, plastics, or other material that is flexible and maintains the shape it is bent into, and is configured to allow base 60 to be easily bent into a position that will be maintained by metal element 105. Metal element 105 may extend entirely around the circumference of base 60, or may be positioned at selected parts of base 60. Metal element 105 may be placed entirely within base 60 to protect metal element 105 from the elements. Body 30 is flexible to be bent into a shape to fit securely into base 60. As shown in FIG. 3, metal ring 105 may include cut outs 110 to reduce the amount of metal needed in metal ring 105.

Base 60 is sized to fit opening 10 and is securable to the inside of the opening edge 16. In particular, it will be appreciated that a user may cut the opening 10 to correspond to the plug base 60 and in some instances may be provided with a cut template (not shown) to guide the user in cutting the appropriate sized and shaped opening according to known methods. Base 60 may be formed integrally with the body 30 and strap 52 or may be formed separately therefrom and the body 30 and base 60 may be secured together with fasteners or the like. The base 60 includes a top flange 82 having a plurality of fastener bores 84 extending therethrough. An inner cylinder 88 extends away from top flange 82 by a distance sufficient to provide an inner mounting surface 86. Annular ridge 90 inside of the top flange 82 is sized to correspond to and be engaged within the groove 44 of the body 30 so as to retain the body 30 therein. The base 60 may be secured within the opening edge 16 proximate to the outside of the sheet metal 14 by fasteners such as screws or the like. The top flange 82 and cylinder 88 define an inner passage 85 therethrough corresponding to the diameter or size and shape of the body 30.

Figure 4:
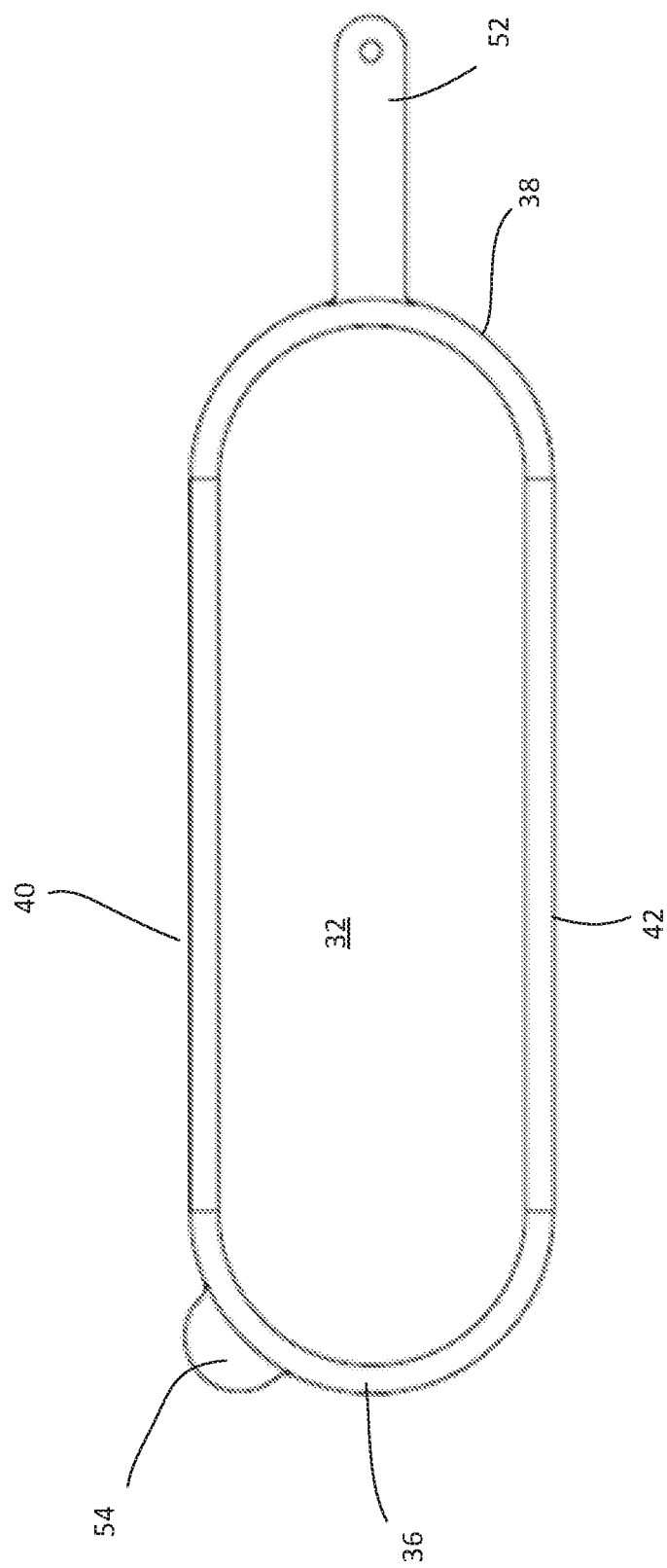
FIG. 4 is a top view of an embodiment of a body according to the invention.

As illustrated in FIGS. 3 and 4, body 30 has a thickness between the front and rear surfaces 32 and 34 which may be selected to be any suitable thickness for properly sealing the opening 10. By way of non-limiting example, the body 30 may have a thickness of between ¼ and 2 inches (6 and 51 mm) with a thickness of approximately ½ inch (25 mm) having been found to be particularly useful. The first and second edges 36 and 38 and first and second sides 40 and 42 of the body 30 define a periphery thereof. Tab 54 extends from body 30 to assist in removal of body 30 from base 60.

The body 30 also includes a groove 44 extending around the periphery and dividing the periphery into a leading and a trailing edge, 46 and 48, respectively. The leading edge 46 is disposed between the front surface 32 and the groove 44 and the trailing edge 48 is disposed between the groove 44 and the rear surface 34 of the body 30. As illustrated, the leading and trailing edge may be rounded although it will be appreciated that other profiles may also be utilized as well, such as by way of non-limiting example, chamfered, beveled or routed. As illustrated, the groove 44 may have a semicircular cross section having a radius generally indicated at 50 of up to ½ inch (12 mm) with a radius of ¼ inch (6 mm) having been found to be particularly useful although other profiles may be utilized as well, such as, by way of non-limiting example, v-notched, arcuate, rectangular or a slot.

The body 30 may be formed of any suitable waterproof material, such as by way of non-limiting example, neoprene, natural or synthetic rubber, silicone or closed cell foam. The body 30 may be formed of any known suitable method, such as by way of non-limiting example, casting, machining, utilizing a router or molding. A spray on protective coating may be used to further protect body 30, such as polyurea elastomer.

Figure 5:
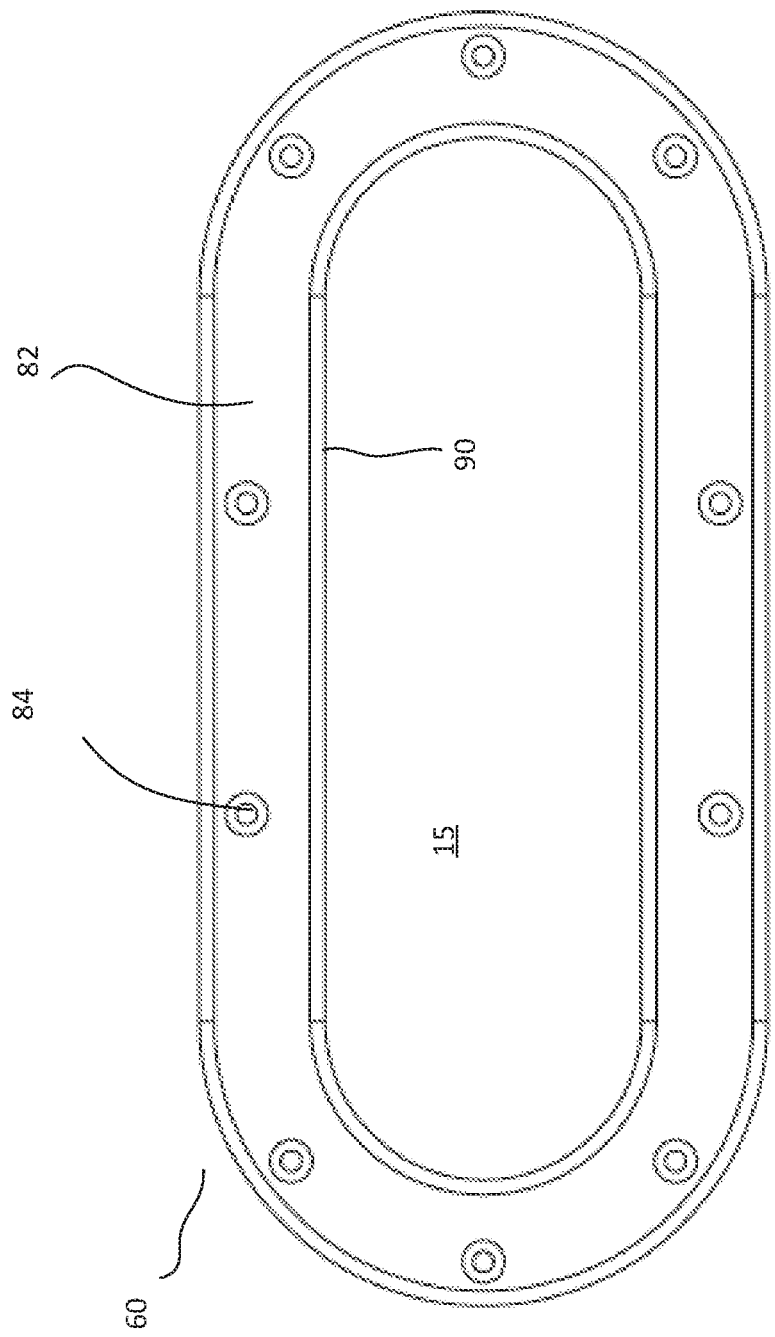
FIG. 5 is a top view of an embodiment of a base according to the invention.

With reference to FIGS. 3 and 5, the base 60 includes a top flange 82 having a plurality of fastener bores 84 extending therethrough. An inner cylinder 88 extends away from top flange 82 by a distance sufficient to provide an inner mounting surface 86. An annular ridge 90 is inside of the top flange 82 sized to correspond to and be engaged within the groove 44 of the body 30 so as to retain the body 30 therein. Base 60 may be secured within the opening edge 16 proximate to the outside of the sheet metal 14 by fasteners 94 passing through the bores 84 to secure the base 60 to the sheet metal layer 14.

Figure 7:
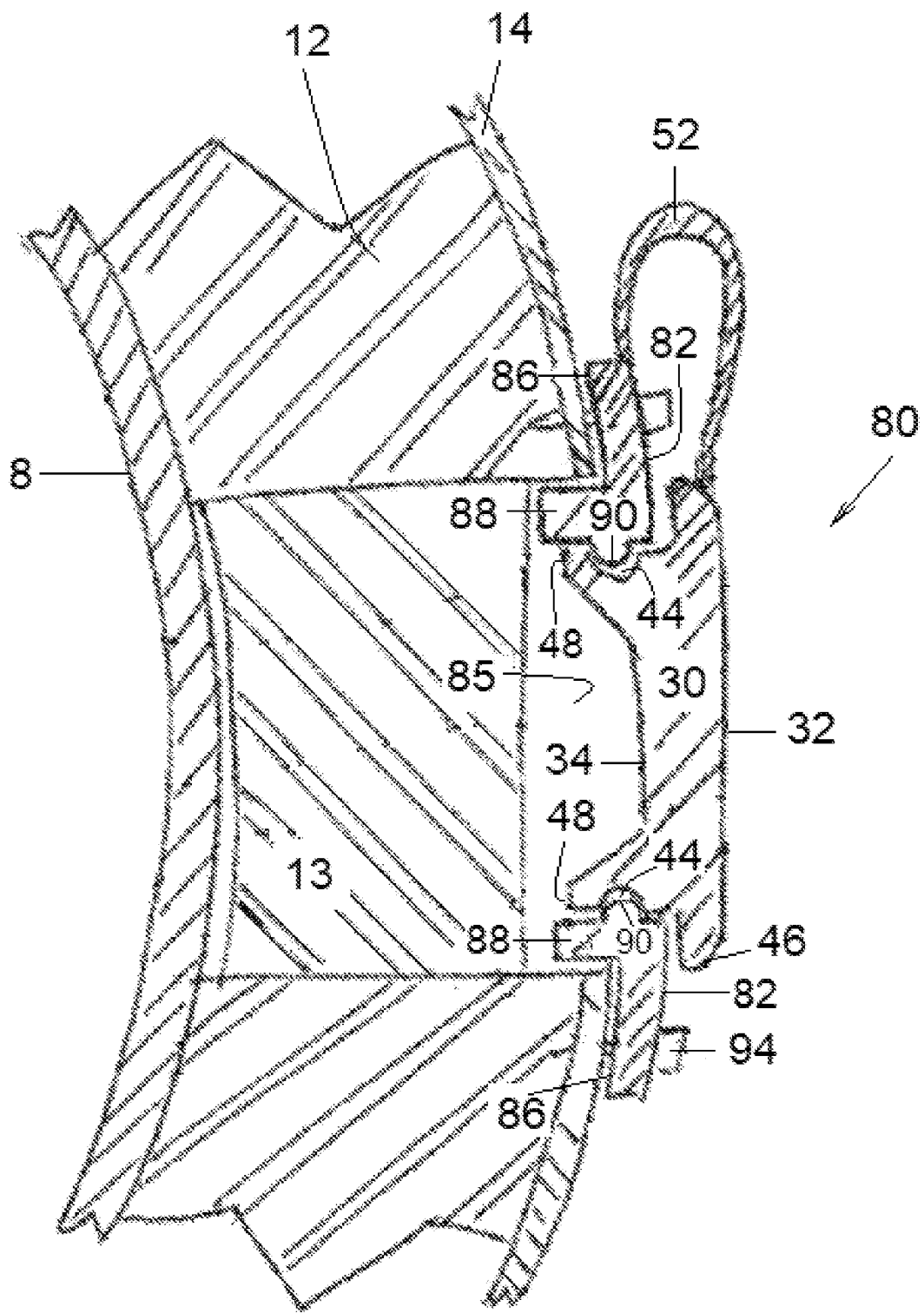
FIG. 7 is a cross-sectional view of the apparatus of FIG. 6 located within a sheath.

Optionally, as illustrated in FIGS. 6 and 7, apparatus 80 may be a ring which is securable to the inside of the opening edge 16. The base 60 is a ring that may be formed integrally with the body 30 and strap 52 or may be formed separately therefrom and the components secured together with fasteners or the like. The base 60 includes top flange 82 having a plurality of fastener bores 84 extending therethrough. Inner cylinder 88 extends away from top flange 82 by a distance sufficient to provide an inner mounting surface 86. The top flange 82 and cylinder 88 define an inner passage 85 therethrough corresponding to the diameter or size and shape of the body 30. Base 60 includes an annular ridge 90 inside of the top flange 82 sized to correspond to and be engaged within the groove 44 of the body 30 so as to retain the body 30 therein. As illustrated in FIG. 7, the base 60 may be secured within the opening edge 16 proximate to the outside of the sheet metal 14. Thereafter, fasteners 94 may be passed through the bores 84 to secure the base ring to the sheet metal layer 14.

In operation a user may cut an opening 10, optionally with the use of a provided template matched to the base 60 through the sheath layer 14 and insulating layer 12 surrounding a pipe 8. Thereafter the cut out insulation and sheath layer opening portions may be removed to provide access to the pipe for maintenance, inspection and the like. After the user has completed their activities requiring access to the pipe 8, the removed insulation or replacement insulation, generally indicated at 13 in FIG. 6 may then be replaced within the opening. The base 60 may then be bent into the proper shape, which is then maintained by metal ring 105, and the base 60 is then installed over the edge of the sheath layer and the body 30 inserted such that the base 60 is sealably received within the groove as illustrated in FIGS. 3 and 7. If future access is required to the pipe 8, the body 30 and replacement insulation 13 may be removed to provide access thereto and thereafter reinserted into the opening 10.

Although the particular preferred embodiments of the invention have been disclosed in detail for illustrative purposes, it will be recognized that variations or modifications of the disclosed apparatus lie within the scope of the present invention.

As will be apparent to those skilled in the art, the various embodiments described above can be combined to provide further embodiments. Aspects of the present systems, methods and components can be modified, if necessary, to employ systems, methods, components and concepts to provide yet further embodiments of the invention. For example, the various embodiments described above may omit some elements, include other elements, and/or place elements in a different position than set out in the illustrated embodiments.

Further, in the methods taught herein, the various acts may be performed in a different order than that illustrated and described. Additionally, the methods can omit some acts, and/or employ additional acts.

These and other changes can be made to the present systems, methods and articles in light of the above description. In general, in the following claims, the terms used should not be construed to limit the invention to the specific embodiments disclosed in the specification and the claims, but should be construed to include all possible embodiments along with the full scope of equivalents to which such claims are entitled. Accordingly, the invention is not limited by the disclosure, but instead its scope is to be determined entirely by the following claims.

While certain aspects of the invention are presented below in certain claim forms, the inventors contemplate the various aspects of the invention in any available claim form.

While specific embodiments of the invention have been described and illustrated, such embodiments should be considered illustrative of the invention only and not as limiting the invention as construed in accordance with the accompanying claims.

What is claimed is:

1. An apparatus for sealing an opening in a metal sheath surrounding an insulated pipe, the apparatus comprising:
 a flexible non-metal base having an outer flange extending away from an inner wall, the inner wall defining an inner passage, the outer flange and the inner wall being integrally formed with one another, the outer flange being removably securable to the metal sheath such that the outer flange contacts the metal sheath and the inner passage provides access to the opening in the metal sheath, the outer flange having a plurality of bores for receiving fasteners to secure the flexible non-metal base to the metal sheath, the outer flange having an integral flexible metal ring element that maintains a bent shape thereby allowing the flexible non-metal base to conform to a curve or an irregularity in the pipe, the inner wall having an annular ridge extending into the inner passage; and a flexible waterproof non-metal body corresponding to the inner passage of the flexible non-metal base such that the flexible waterproof non-metal body is removably engageable with the inner wall to seal the inner passage, a groove on a periphery of the flexible waterproof non-metal body corresponds to and is engageable with the annular ridge for holding the flexible waterproof non-metal body in the inner passage, the flexible waterproof non-metal body conforming to the shape of the flexible non-metal base when sealing the inner passage.

2. The apparatus of claim 1 wherein the flexible metal ring is made of steel.

3. The apparatus of claim 1 wherein the flexible non-metal body is formed of a material selected from the group consisting of neoprene, rubber, silicone and closed cell foam.

4. The apparatus of claim 1 wherein the flexible non-metal base is formed of a material selected from the group consisting of neoprene, rubber, silicone and closed cell foam.

5. The apparatus of claim 1 wherein the inner passage is elongate with substantially parallel sides.

6. The apparatus of claim 1 wherein the inner passage is cylindrical.

7. The apparatus of claim 1 wherein the groove has a constant radius and has a radius of less than ½ inch.

8. The apparatus of claim 7 wherein the groove is located in a middle of the periphery of the flexible waterproof elongate body.

9. The apparatus of claim 1 further comprising a leading surface of the periphery extending from the groove by a distance greater than a trailing surface of the periphery.

10. The apparatus of claim 9 wherein at least one of the leading and trailing surface of the periphery of the flexible waterproof non-metal body is rounded.

11. The apparatus of claim 1 wherein the apparatus further comprises a securing means for movably securing the flexible non-metal base to the flexible waterproof non-metal body.

12. The apparatus of claim 11 wherein the securing means is a strap.

13. The apparatus of claim 12 wherein the strap is integrally formed with both the flexible waterproof non-metal body.

14. The apparatus of claim 12 wherein the strap is integrally formed with both the flexible waterproof non-metal body and the flexible non-metal base.

15. The apparatus of claim 1 wherein the flexible metal ring has a plurality of bores corresponding to the plurality of bores of the outer flange such that the fasteners pass through the flexible metal ring and the outer flange when the outer flange is removably secured to the metal sheath.

16. An apparatus for sealing an opening in a metal sheath surrounding an insulated pipe, the apparatus consisting of:

a flexible non-metal base having an outer flange extending away from an inner wall, the inner wall defining an inner passage, the outer flange and the inner wall being integrally formed, the outer flange being removably securable to the metal sheath such that the outer flange contacts the metal sheath and the inner passage provides access to the opening in the metal sheath, the outer flange having a plurality of bores for receiving fasteners to secure the flexible non-metal base to the metal sheath, the outer flange having an integral flexible metal ring element that maintains a bent shape allowing the flexible non-metal base to conform to a curve or an irregularity in the pipe, the inner wall having an annular ridge extending into the inner passage;

a flexible waterproof non-metal body having a shape corresponding to the inner passage of the flexible non-metal base such that the flexible waterproof non-metal body is removably engageable with the inner wall for sealing the inner passage, a groove on a periphery of the flexible waterproof non-metal body corresponds to and is matingly engageable with the annular ridge for holding the flexible waterproof non-metal body in the inner passage, and the flexible waterproof non-metal body conforming to the shape of the flexible non-metal base when sealing the inner passage.

17. The apparatus of claim 16 wherein the flexible metal ring is made of steel.

18. The apparatus of claim 16 wherein the flexible non-metal body is formed of a material selected from the group consisting of neoprene, rubber, silicone and closed cell foam.

19. The apparatus of claim 16 wherein the flexible non-metal base is formed of a material selected from the group consisting of neoprene, rubber, silicone and closed cell foam.

20. The apparatus of claim 16 wherein the inner passage is elongate with substantially parallel sides.

21. The apparatus of claim 16 wherein the inner passage is cylindrical.

22. The apparatus of claim 16 wherein the groove has a constant radius.

23. The apparatus of claim 22 wherein the groove has a radius of less than ½ inch.

24. The apparatus of claim 22 wherein the groove is located in a middle of the periphery of the flexible waterproof elongate body.

25. The apparatus of claim 16 further comprising a leading surface of the periphery extending from the groove by a distance greater than a trailing surface of the periphery.

26. The apparatus of claim 25 wherein at least one of the leading and trailing surface of the periphery of the flexible waterproof non-metal body is rounded.

27. The apparatus of claim 16 wherein the apparatus further comprises a securing means for securing the flexible non-metal base to the flexible waterproof non-metal body.

28. The apparatus of claim 27 wherein the strap is integrally formed with the flexible waterproof non-metal body.

29. The apparatus of claim 27 wherein the strap is integrally formed with both the flexible waterproof non-metal body and the flexible non-metal base.

30. An apparatus for sealing an opening in a metal sheath surrounding an insulated pipe, the apparatus comprising:

a flexible non-metal base comprising an outer flange, and an inwardly facing surface of the outer flange comprising a curved inner wall which forms an annular ridge and defines an inner passage, the outer flange and the inner wall being integrally formed with one another, a bottom surface of the outer flange being removably engageable and securable to the metal sheath such that the outer flange contacts the metal sheath and the inner passage provides access to the opening in the metal sheath, the outer flange having an integral flexible metal ring element which facilitates the outer flange maintaining a bent shape thereby allowing the at least the outer flange of the flexible non-metal base to conform to a curvature or an irregularity in the pipe, the outer flange having a plurality of bores passing through both the outer flange and the integral flexible metal ring element, and respective fastener is received by each one of the plurality of bores for securing the outer flange and the integral flexible metal ring element to the metal sheath;

a flexible waterproof non-metal body having a shape which partially fits within the inner passage of the flexible non-metal base, a periphery of the flexible waterproof non-metal body having a curved groove which corresponds to and matingly engages with the annular ridge for retaining the flexible waterproof non-metal body within the inner passage and sealing and preventing access to the inner passage, and the flexible waterproof non-metal body being removably engageable with the flexible non-metal base;

a thickness of the flexible waterproof non-metal body being thicker than a thickness of the flexible non-metal base so that, when the flexible waterproof non-metal body engages with the flexible non-metal base, a portion of the flexible waterproof non-metal body engages with both a top surface and the bottom surface of the flexible non-metal base; and a strap being integrally formed with both the flexible waterproof non-metal body and the flexible non-metal base for connecting the flexible waterproof non-metal body to the flexible non-metal base.

\* \* \* \* \*